United States Patent [19]

Betz et al.

[11] 4,166,867
[45] Sep. 4, 1979

[54] PALATABILITY IN HORSE FEEDS

[75] Inventors: Norman L. Betz, St. Louis, Mo.; Kent J. Lanter, Belleville; Leslie H. Breuer, Alhambra, both of Ill.; Frederick H. Steinke, Crestwood, Mo.

[73] Assignee: Ralston Purina Company, St. Louis, Mo.

[21] Appl. No.: 876,306

[22] Filed: Feb. 9, 1978

[51] Int. Cl.² .......................... A23L 1/30; A23K 1/00
[52] U.S. Cl. ........................................ 426/73; 426/99; 426/623; 426/630; 426/635; 426/651
[58] Field of Search ..................... 426/72, 73, 74, 89, 426/99, 623, 630, 635, 651, 656

[56] References Cited

U.S. PATENT DOCUMENTS

| | | | |
|---|---|---|---|
| 1,285,555 | 11/1918 | Bradley | 426/651 |
| 2,921,853 | 1/1960 | Card et al. | 426/651 |
| 3,946,115 | 3/1976 | Brever et al. | 426/73 |

OTHER PUBLICATIONS

Furie et al., "Fenarelio Handbook of Flavor Ingredients" Chemical Rubber Co. Publishers, 1971, pp. 148–150.

Primary Examiner—R. B. Penland
Attorney, Agent, or Firm—W. Dennis Drehkoff; Veo Peoples, Jr.

[57] ABSTRACT

Lemon oil at extremely low levels is found to greatly enhance the palatability of even an extruded horse ration.

10 Claims, No Drawings

PALATABILITY IN HORSE FEEDS

BACKGROUND OF THE INVENTION

This invention relates generally to horse feeds and feeding but more specifically to improved palatability in horse feeds.

High performance horses such as show or exhibition horses, harness horses and especially race horses pose especially vexing problems for their owners and trainers. For example, it has been found to cost an average of $5,100 to produce and raise a race horse to two years of age, plus an additional $3,400 to keep him in training the first year. Thus, when a race horse fails to perform, following one year in training and on the track, an investment of $8,500 in addition to the cost of the horse is involved. Obviously, the stakes are high to keep him sound and running. Although some unsoundness may be inherited, others may be due to accident and injury and still others may be due to subjecting to stress and strain beyond the capabilities of even the best structure and tissue, it has been determined that nutritional deficiencies have been considered a problem.

Oftentimes, in spite of the nutritional balance of the ration and even in spite of tailoring a particular horse's feed to his individual nutritive requirements, many high performance horses will still be "hard keepers." That is, the animals will not consume a nutritionally adequate amount within the specified time for feeding.

Accordingly, flavoring aids and palatability enhancers have gained wide acceptance in the industry. Although many such additives are available all are not effective for every horse under every condition. For example, prior art flavoring additives such as anise or licorice root, anise oil, monosodium glutamate, ginger, vanillin and molasses have been employed. Molasses (beet and cane variety) which is used most commonly is relished by most horses. It is used either diluted or undiluted on grain or hay. Additionally, few if any of the flavoring additives have been found to improve the palatability of the extruded high performance horse feed described in U.S. Pat. No. 3,946,115 which is highly palatable in its own right. Nevertheless, there is a need for an even more palatable feed, and there is an ongoing need for new and untested flavoring aids which might be effective where others fail.

SUMMARY OF THE INVENTION

It is an object of the present invention to provide a more palatable feed for the "hard keepers."

It is a further object of this invention to provide a flavoring agent to satisfy the ongoing search for uniquely palatable feeds that will be consumed readily by even the most difficult of horses in the most difficult situations and yet which could be applied in practical amounts which would not distort the nutritional balance of the ration.

A horse feed, especially an extruded feed containing lemon oil in an amount less than 0.01% by weight of the feed will fulfill the objects of this invention.

DESCRIPTION OF THE PREFERRED EMBODIMENTS

In accordance with the present invention, lemon oil when added to all classifications of horse feeds will result in improved palatability. The feeds are generally indexed according to the percentage of total digestible nutrients such as carbohydrates, fats and proteins. Accordingly, the feeds of this invention will include, for example, concentrates which contain at least 65% total digestible nutrients but are low in fiber (less than 10%), and roughage which is low in total digestible nutrients but proportionately high in fiber. The concentrates may be carbonaceous concentrates which are low in protein but high in energy value or the concentrates may be protein supplements which as the name implies are higher in protein.

Cereal grains such as oats, corn, barley, grain sorghum, wheat and rye are commonly used as carbonaceous supplements while beet pulp, molasses and wheat bran may be employed in varying amounts to provide higher energy values. The protein supplements may be derived from legume seeds such as soybeans and field peas or from by-product sources such as linseed oil meal, cottonseed meal, soybean meal and corn gluten feed and meal.

In the preparation of conventional horse rations the feed ingredients are milled, blended and pressed into pellets through for example, a pellet mill. For such rations the lemon oil may be coated over the exterior of the pellets, however, it is preferred for purposes of handling and effectiveness that the lemon oil be blended with the remainder of the ingredients. When applied on the inside of the ration the amount of lemon oil should be between about 0.01% and 0.001%, by weight of the ration, preferably 0.003%. The lemon oil should be a feed-grade suitable for horses and commercially available from a number of sources.

Extruded Feed

It is especially preferred that an extruded ration be utilized containing less than 0.01% lemon oil. Preferably, lemon oil at 0.0003% by weight of ration is admixed in the oil coating later described and coated onto the ration.

Generally, a feed is produced from particular farinaceous, proteinaceous and fibrous sources with additional vitamin and mineral supplements as needed to make the feed nutritionally complete. The product is highly palatable and nutritionally superior either when fed alone or when fed mixed with other feeds.

The farinaceous components of the present invention are preferably corn, wheat, flour, wheat meal by-products, wheat and wheat middlings. In spite of the long felt belief and conventional practice of utilizing oats as the primary or preferred grain source of starch for horses, it has been discovered that oats are not necessary nor preferred for purposes of extruded rations. The underlying reason for this is not precisely understood. In the present invention, even though corn and wheat are ordinarily less palatable to horses than oats in an unprocessed feed, the corn, wheat and wheat middlings when processed are significantly more palatable than are oats when processed by extrusion. The total amount of the farinaceous material of this extruded ration ranges from 35 to about 65% by weight based on the overall weight of the final product. However, it is preferred to use from 40 to 50%.

The proteinaceous material needs to be a source of high quality protein. One might expect that, by virtue of the horse's ability to manufacture some good quality protein in its caecum or large intestine, the horse has no particular need for additional high quality protein nor for well processed extruded feed. But this is not the case. The source of protein is critical in accomplishing the advantages of an extruded feed. Examples of suitable proteinaceous materials are legume seed meals such as soybean meal, soy flour, peanut meal, rapeseed meal, cottonseed meal, safflower seed meal and mixtures thereof. Meat and fish scraps, although high in protein and frequently used in other extruded feeds, have no utility in the applicants' formulation. Their palatability to horses is low in the extruded product. It is particularly preferred for convenience, economy and efficiency to utilize soybean meal as the proteinaceous material. The amount of proteinaceous material utilized is from about 10 to about 30% by weight of the final product and preferably from 20 to about 25%.

The fibrous material is required in order to provide adequate structural strength or integrity to the final feed pellets and also to effect stool normality. Although oat hulls and alfalfa are conventionally utilized for their fiber in non-extruded horse feeds, such materials lack the requisite palatability for applicants' extruded feed. These materials cause a rough grainy or gritty surface texture in the pellets which is apparently offensive to horses. It is not understood why such effect is only prevalent in the extruded feed but the fact remains that it is. Accordingly, it has been unexpectedly discovered that soybean hulls, rice hulls and cottonseed hulls are the preferred fibrous material of the present invention in spite of their lower palability in non-extruded feeds. Soybean hulls are particularly preferred. The amount of fibrous material may be from about 5 to about 30% by weight of the final product; however, it is preferred to use 15%.

The nutritional supplements of the present invention are the fat soluble and water soluble vitamins and minerals which are nutritionally advantageous to high performance horses. Typical ones are vitamins A, D, E and the B vitamins, riboflavin, niacin, thiamine, biotin, pantothenic, choline, pyridoxine, and also ascorbic acid and calcium, phosphorus, copper, iron, manganese, iodine, zinc, cobalt, salts such as sodium chloride and combinations thereof. The nutritional supplements are utilized in an overall amount of from about 3 to 4% by weight of the feed.

In the process of making the extruded horse feed, the above-described farinaceous, proteinaceous, fibrous and nutritional ingredients are uniformly mixed and finely ground. The materials may be ground separately or they may be mixed prior to grinding. If desired, small amounts of vegetable oil (about 2%) can be added to soften the mixture for ease of working. After grinding, the mixture is introduced into a steam conditioning chamber at from about 85° to about 98° C. to bring the moisture content up to between about 25 to 35% by weight of the mixture. The damp mixture is formed, by minimal expansion extrusion, into relatively homogeneous feed particles. The conditions of forming are carefully controlled to produce feed particles having a bulk density of above 32 pounds per bushel but preferably from 35 to 42 pounds per bushel. The particles must also be formed in a manner which gives them a smooth texture with a minimum of torn or rough surface projections. The particles are formed into shapes which may have a length of from ⅛ inch to 3 inches. Preferably, the particles should be formed into shapes having rounded edges, such as small cylinders or rounded ovals. The particular shapes should have mean statistical diameters between 0.15 and 0.6 inches.

The statistical diameter of the particles is determined by the method of Martin and a mean is taken by analyzing a random sample of the product. (cf. Small Particles Statistics, G. Herdan and M. L. Smith, Chapter 5, pages 61–98.) A sufficiently large sample is taken so that the standard error of the mean is within ±0.01.

The process of this aspect of the invention may be practiced on a conventional extrusion device. The rotating screw of the extruder device creates a high pressure on the material in the extruder. It is believed that the particulate material fed in changes form until it finally flows in a generally fluid manner, even squeezing around the outer periphery of the screw in a recirculating fashion, to cause a severe mechanical working of the substance. Part of the pressure is caused by the screw. Part of the pressure is due to the high temperatures which result both from friction between the flowing product and components of the extruder and from heat that it purposely added to the outside of the extruder, if under normal operation. This added heat is preferably obtained by passing steam and/or water through a forward or front annular jacket within the extruder housing around, but separate from, the forward end of the extruder chamber. Steam may also be added directly into the extruder to increase the temperature of the material and/or to raise the moisture content of the material, if desired. The amount of heat applied is controlled by typical valving techniques in a manner to obtain temperatures which are not sufficiently high so as to cause the product to scorch or burn, but which are sufficiently high to cause the desired chemical and physical reactions within the material. The amount of added heat to do this will vary with the particular extruder construction, but can be readily determined by trial and error during the initial stages of operation of the equipment.

In addition to the steam jacket for adding heat, an annular cooling jacket surrounds the rear portion of the extruder chamber. This has been found desirable in normal operation to maintain lower temperatures in the initial stages of operation.

The moisture content and grind of the damp material and the temperatures and pressures of extrusion must be selected in a manner to produce an extruded product which will have the desired properties. In particular, the bulk density of the extruded material must be above about 32 pounds per bushel, preferably about 35 to 42 pounds per bushel and most preferably 38 pounds per bushel after the product has been dried to a moisture content of about 10 to 12% by weight.

The extrudate, after processing, forming and cutting, is then uniformly coated with vegetable oil to form the final product. In spite of the fact that hot liquid animal fat is ordinarily equivalent to vegetable oil as a coating on other extruded products, it has no utility in the applicants' extruded horse feed. Only vegetable oil is suitably palatable to horses as a coating on the applicants' extruded product. The explanation is not apparent at this time. The vegetable oils of the present invention are, for example, corn oil, soybean oil, safflower oil, cottonseed oil or peanut oil. Soybean oil is preferred. The oil is applied in an amount of from about 2% to about 10% by weight of the final product but preferably 4%. The coating may be applied by spraying weighed batches or as part of a continuous process with any appropriate metering device. The spray coating, if desired, may be followed by or even substituted by a period of oil blending to insure uniformity. Spray coating is preferred.

It is at this stage, the coating stage, of the extrusion process that the extra palatable lemon oil is employed.

The lemon oil is preferably added into the coating oil prior to spraying the oil coating onto the feed. Good results may be achieved by adding less than 0.01% lemon oil by weight of the feed. The best results are achieved between 0.0001 and 0.001%. It is preferred that about 0.0003% lemon oil be utilized.

The Application of Lemon Oil

It is of note that the effectiveness of lemon oil does not necessarily vary in direct proportion to the amount. For example, in pelleted rations the horses were found to reject the ration if as much as 0.03% lemon oil was present. In the case of an extruded ration, although the horses preferred a ration containing 0.003% lemon oil over a ration which contained no lemon oil, the preference was even stronger at 0.0003%.

The following examples will provide a detailed illustration of the objectives and embodiments of this invention:

EXAMPLE 1

An extruded ration was prepared containing a mixture of 32.5 parts corn, 10 parts wheat, 10 parts wheat middlings, 15 parts soy hulls, 22.9 parts soybean meal and 3.6 parts vitamins and minerals. The mixture was finely ground and introduced into the steam conditioner of an extruder wherein 30% moisture by weight was added to the mixture at about 85° C. The mixture was then passed through an extruder at about 130° C. having an oval shaped die adapted to provide particles measuring $\frac{3}{8} \times \frac{1}{4}$ inches between diameters and resulting in a bulk density of 38 pounds per bushel. The product was dried to about 12% moisture by weight. The 6 parts soybean oil was uniformly sprayed onto the pellets. This ration was labeled the Control.

A portion of the feed prepared above had 0.003% lemon oil by weight of the feed added to the soybean oil and the ration was labeled A. An identically prepared ration as A except containing only 0.0003% lemon oil in the soybean oil was labeled B.

Six yearling quarter horses were each offered two bowls of ration of identical size during feeding periods over a five-day test. For three of the horses, one bowl contained the Control and the other contained ration A. For the other three horses the choice offered was between the Control and ration B. The daily consumption in pounds for each horse is listed in Tables I through VI.

TABLE 1

| Days/Ration | Control | A |
|---|---|---|
| 1 | 3.3 | 10.1 |
| 2 | 9.5 | 6.3 |
| 3 | 7.3 | 5.5 |
| 4 | 8.8 | 1.9 |
| 5 | 5.1 | 6.1 |
| Total | 34.0 | 29.9 |

TABLE II

| Days/Ration | Control | A |
|---|---|---|
| 1 | 1.3 | 9.4 |
| 2 | 2.6 | 7.7 |
| 3 | 4.5 | 6.4 |
| 4 | 3.7 | 9.1 |
| 5 | 3.6 | 7.5 |
| Total | 15.7 | 40.1 |

TABLE III

| Days/Ration | Control | A |
|---|---|---|
| 1 | 6.1 | 3.9 |
| 2 | 9.6 | 2.0 |
| 3 | 6.3 | 6.3 |
| 4 | 5.9 | 6.2 |
| 5 | 3.8 | 6.8 |
| Total | 31.7 | 25.2 |

Grand Total Control: 81.4 pounds
Grand Total A: 95.2 pounds
Grand Total Preferences of at least 1 lb./day for Control: 5
Grand Total Preferences of at least 1 lb./day for A: 8

Note that the horses consumed more of A than Control in total pounds and preferred A more often than the Control. The fact that two of the three horses consumed more Control than A is a bit misleading but the number of choices and the total consumption places heavier weight on the conclusion that A is more palatable than the Control. Tables IV through VI will provide more examples of preference.

TABLE IV

| Days/Ration | Control | B |
|---|---|---|
| 1 | 3.7 | 7.7 |
| 2 | 1.9 | 11.8 |
| 3 | 7.3 | 3.3 |
| 4 | 3.5 | 9.3 |
| 5 | 6.0 | 5.2 |
| Total | 22.4 | 37.3 |

TABLE V

| Days/Ration | Control | B |
|---|---|---|
| 1 | 1.6 | 9.4 |
| 2 | 4.5 | 6.5 |
| 3 | 4.7 | 9.2 |
| 4 | 3.5 | 9.8 |
| 5 | 1.6 | 11.1 |
| Total | 15.9 | 46.0 |

TABLE VI

| Days/Ration | Control | B |
|---|---|---|
| 1 | 1.2 | 9.5 |
| 2 | 2.3 | 9.3 |
| 3 | 0.4 | 11.4 |
| 4 | 1.4 | 9.0 |
| 5 | 2.1 | 9.2 |
| Total | 7.4 | 48.4 |

Grand Total Consumption
Control:—45.7
B:—131.7
Grand Total of Preferences of at least 1 lb./day:
Control:—1
B:—13

EXAMPLE 2

A pelleted ration of Horse Chow from Ralston Purina was used.

The pelleted feed without the lemon oil was labeled Basal while a pelleted ration of Horse Chow was prepared containing 0.03% lemon oil mixed in was labeled C, and one containing 0.003% lemon oil was labeled D.

The feeding studies conducted were performed in an identical manner as those of Example 1 except more horses were used and each horse was tested over a longer period.

Only the results of preferences of at least 1 pound per head per day are reported in Table VII.

TABLE VII

|  | Times Preferred | | Times No |
| --- | --- | --- | --- |
|  | Basal | Test Ration | Preference |
| C(0.03%) | 164 | 7 | 4 |
| D(0.003%) | 4 | 176 | 2 |

What is claimed is:

1. An improved method of making a high performance horse feed comprising the steps of grinding and extruding at from about 115° to about 163° C. to a bushel weight of about 32 pounds per bushel and a particle size of from ⅛ to 3 inches in length and a mean diameter of from 0.15 to 0.6 inches, a combination comprising, by weight of the combination, from about 35 to 65% farinaceous material selected from the group consisting of wheat, wheat flour, wheat meal by-products and corn from 10 to 35% proteinaceous material selected from the group consisting of soybean mean, soy flour, peanut meal, cottonseed meal and safflower seed meal, from about 5 to 30% fibrous materials selected from the group consisting of soy hulls, cottonseed hulls, and rice hulls and from 3 to 4% nutritional supplements and between about 25 and 35% added moisture based on the weight of the combination; and thereafter drying to about 10% and coating the extruded combination with from 2 to 10% by weight vegetable oil selected from the group consisting of soybean oil, corn oil, safflower oil, cottonseed oil and peanut oil;

said improvement comprising adding from about 0.0003% to about 0.003% lemon oil to the oil coating.

2. The method of claim 1 wherein the amount of farinaceous material is from 40 to 50% by weight based on the total weight of the feed.

3. The method of claim 2 wherein the extrusion is conducted at 130° C.

4. The method of claim 1 wherein the amount of proteinaceous material is from 20 to 25% by weight based on the total weight of the feed.

5. The method of claim 1 wherein the amount of fibrous material is 15% by weight based on the total weight of the feed.

6. The method of claim 1 wherein 4% soybean oil is coated onto the product.

7. The method of claim 1 wherein the product is extruded to a bushel weight of from 35 to 42 pounds per bushel.

8. The method of claim 1 wherein the amount of lemon oil is about 0.0003%.

9. An extruded and vegetable oil coated high performance horse feed having substantially improved available energy supply and palatability, said feed comprising farinaceous material selected from the group consisting of wheat, wheat flour, wheat meal by-products and corn in an amount of 35 to 65% by weight based on the total weight of the feed, further comprising proteinaceous material selected from the group consisting of soybean meal, soy flour, peanut meal, cottonseed meal, safflower seed meal in an amount of from 10 to 30% by weight based on the total weight of the feed, further comprising fibrous material selected from the group consisting of soy hulls, cottonseed hulls, rice hulls in an amount of from about 5 to 30% by weight based on the total weight of the feed, further comprising nutritional supplements selected from the group consisting of vitamins A, D and E, ascorbic acid, biotin, pantothenic, choline, niacin, pyridoxine, riboflavin, thiamine, calcium, phosphorus, NaCl, copper, iron, manganese, iodine, zinc and combinations thereof, in an amount of from 3 to 4% by weight based on the total weight of the feed, further comprising a vegetable oil coating, said oil selected from the group consisting of soybean oil, corn oil, safflower oil, cottonseed oil, peanut oil, in an amount of from 2 to 10% by weight based on the total weight of the feed, and having a bushel weight of about 32 pounds per bushel, a particle size of from ⅛ to 3 inches in length and a mean diameter of from 0.15 to 0.6 inches, the improvement comprising addng from about 0.0003% to about 0.003% lemon oil in the oil coating.

10. The product of claim 9 wherein the amount of lemon oil is about 0.0003%.

* * * * *

UNITED STATES PATENT AND TRADEMARK OFFICE
CERTIFICATE OF CORRECTION

PATENT NO. : 4,166,867
DATED : September 4, 1979
INVENTOR(S) : Norman L. Betz et al It is certified that error appears in the above-identified patent and that said Letters Patent are hereby corrected as shown below:

Column 4, line 17:

"it" should read "is"

Column 7, line 10:

"7" should read "17"

Column 7, line 26:

"mean" should read "meal"

Signed and Sealed this

Twentieth Day of May 1980

[SEAL]

Attest:

Attesting Officer

SIDNEY A. DIAMOND

Commissioner of Patents and Trademarks